US012609472B2

(12) United States Patent
Zhang et al.

(10) Patent No.: US 12,609,472 B2
(45) Date of Patent: Apr. 21, 2026

(54) CONNECTOR AND CONNECTOR ASSEMBLY

(71) Applicants: SIBAS Electronics (Xiamen) Co. Ltd., Xiamen City (CN); Tyco Electronics (Shanghai) Co., Ltd., Shanghai (CN)

(72) Inventors: Daokuan (Jeremy) Zhang, Shanghai (CN); Weidong (Randy) Huang, Xiamen (CN); Yong (Chris) Wang, Shanghai (CN); Hua He, Shanghai (CN); Xinzheng (Tony) Fan, Shanghai (CN); Jianfei (Fencer) Yu, Shanghai (CN)

(73) Assignees: SIBAS Electronics (Xiamen) Co., Ltd., Xiamen City (CN); Tyco Electronics (Shanghai) Co., Ltd., Shanghai (CN)

( * ) Notice: Subject to any disclaimer, the term of this patent is extended or adjusted under 35 U.S.C. 154(b) by 293 days.

(21) Appl. No.: 18/457,424

(22) Filed: Aug. 29, 2023

(65) Prior Publication Data

US 2024/0072472 A1 Feb. 29, 2024

(30) Foreign Application Priority Data

Aug. 31, 2022 (CN) ........................ 202222311471.7

(51) Int. Cl.

*H01R 13/02* (2006.01)
*H01R 13/20* (2006.01)
*H01R 13/428* (2006.01)
*H01R 13/6581* (2011.01)

(52) U.S. Cl.

CPC ........... *H01R 13/025* (2013.01); *H01R 13/20* (2013.01); *H01R 13/428* (2013.01); *H01R 13/6581* (2013.01)

(58) Field of Classification Search

CPC .... H01R 13/025; H01R 13/20; H01R 13/428; H01R 13/6581; H01R 13/562; H01R 24/64; H01R 13/504

USPC .................................................. 439/495, 499

See application file for complete search history.

(56) References Cited

U.S. PATENT DOCUMENTS 10,608,383 B2 * 3/2020 Kumamoto ........ H01R 13/6593
2022/0131319 A1 * 4/2022 Uemura ................ H01R 13/40

* cited by examiner

*Primary Examiner* — Charles Reid, Jr.

(74) *Attorney, Agent, or Firm* — Barley Snyder

(57) ABSTRACT

A connector comprises an insulation housing, a shielding shell, an inner sheath, and an outer sheath. The shielding shell is sheathed on the insulation housing. The inner sheath is formed on the shielding shell by injection molding. The inner sheath includes a front end wrapped on the shielding shell and a retaining portion formed on the front end of the inner sheath and spaced from the shielding shell to form a gap therebetween. The outer sheath is formed on the shielding shell and the inner sheath by injection molding. The outer sheath includes an engaging portion embedded in the gap between the retaining portion and the shielding shell. The retaining portion holds the engaging portion on the shielding shell to prevent the formation of a gap between the front end of the outer sheath and the shielding shell.

18 Claims, 4 Drawing Sheets

CONNECTOR AND CONNECTOR ASSEMBLY

CROSS-REFERENCE TO RELATED APPLICATIONS

This application claims the benefit of Chinese Patent Application No. CN202222311471.7 filed on Aug. 31, 2022, in the State Intellectual Property Office of China, the whole disclosure of which is incorporated herein by reference.

FIELD OF THE INVENTION

The present invention relates to a connector and a connector assembly including the connector.

BACKGROUND

Data and network systems play a critical role in modern society. Accordingly, reliable electrical connections within these systems are critical. Current registered jack (RJ) interfaces, and specifically RJ45 connectors (e.g., those used in ethernet applications), typically include an insulation housing, a connection terminal, a shielding shell, an inner sheath, and an outer sheath. The connection terminal is arranged in the insulation housing. The shielding shell is sheathed on the insulation housing to prevent electromagnetic interference from influencing the connection terminal. The inner sheath is molded onto the shielding shell to protect it. The outer sheath is molded onto the inner sheath and shielding shell to provide protection for an associated cable.

In the prior art, the rear of the shielding shell extends rearward beyond the rear end of the insulation housing and is embedded in the inner sheath, making the shielding shell and the inner sheath tightly bonded. However, the shielding shell is not embedded in the outer sheath. As a result, when thermal expansion and contraction occur, a gap can easily be formed between the outer sheath and the shielding shell, as the thermal expansion coefficients of the outer sheath made of plastic and the shielding shell made of metal are different.

SUMMARY

According to an embodiment of the present disclosure, a connector comprises an insulation housing, a shielding shell, an inner sheath, and an outer sheath. The shielding shell is sheathed on the insulation housing. The inner sheath is formed on the shielding shell by injection molding. The inner sheath includes a front end wrapped on the shielding shell and a retaining portion formed on the front end of the inner sheath and spaced from the shielding shell to form a gap therebetween. The outer sheath is formed on the shielding shell and the inner sheath by injection molding. The outer sheath includes an engaging portion embedded in the gap between the retaining portion and the shielding shell. The retaining portion holds the engaging portion on the shielding shell to prevent the formation of a gap between the front end of the outer sheath and the shielding shell.

BRIEF DESCRIPTION OF THE DRAWINGS

The invention will now be described by way of example with reference to the accompanying Figures, of which.

DETAILED DESCRIPTION OF THE EMBODIMENTS

Figure 1:
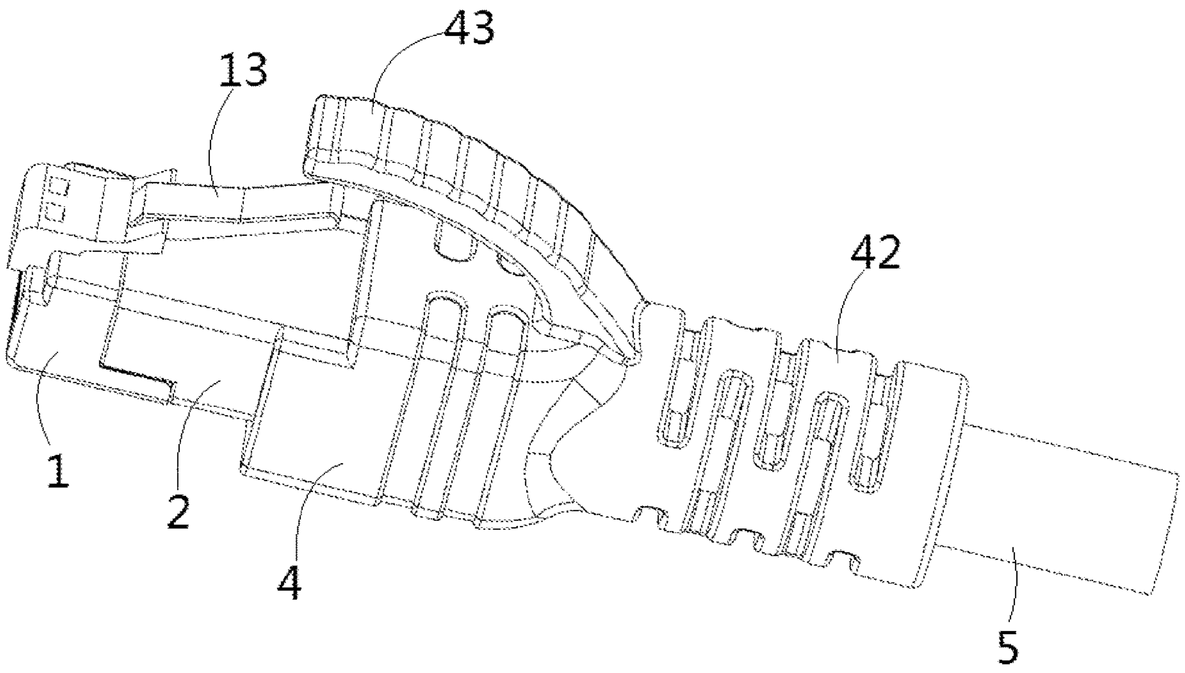
FIG. 1 is an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a connector (e.g., an RJ45 connector) comprises an insulation housing, a shielding shell sheathed on the insulation housing, an inner sheath formed on the shielding shell by injection molding, and an outer sheath formed on the shielding shell and the inner sheath by injection molding. The inner sheath has a front end wrapped on the shielding shell. A retaining portion is formed on the front end of the inner sheath, and is spaced from the shielding shell to form a gap therebetween them. The outer sheath has an engaging portion embedded in the gap between the retaining portion and the shielding shell. The retaining portion holds the engaging portion on the shielding shell to prevent the formation of a gap between the front end of the outer sheath and the shielding shell.

According to another embodiment of the present disclosure, a connector assembly comprises of the above-described connector, and a mating connector mateable therewith.

Figure 2:
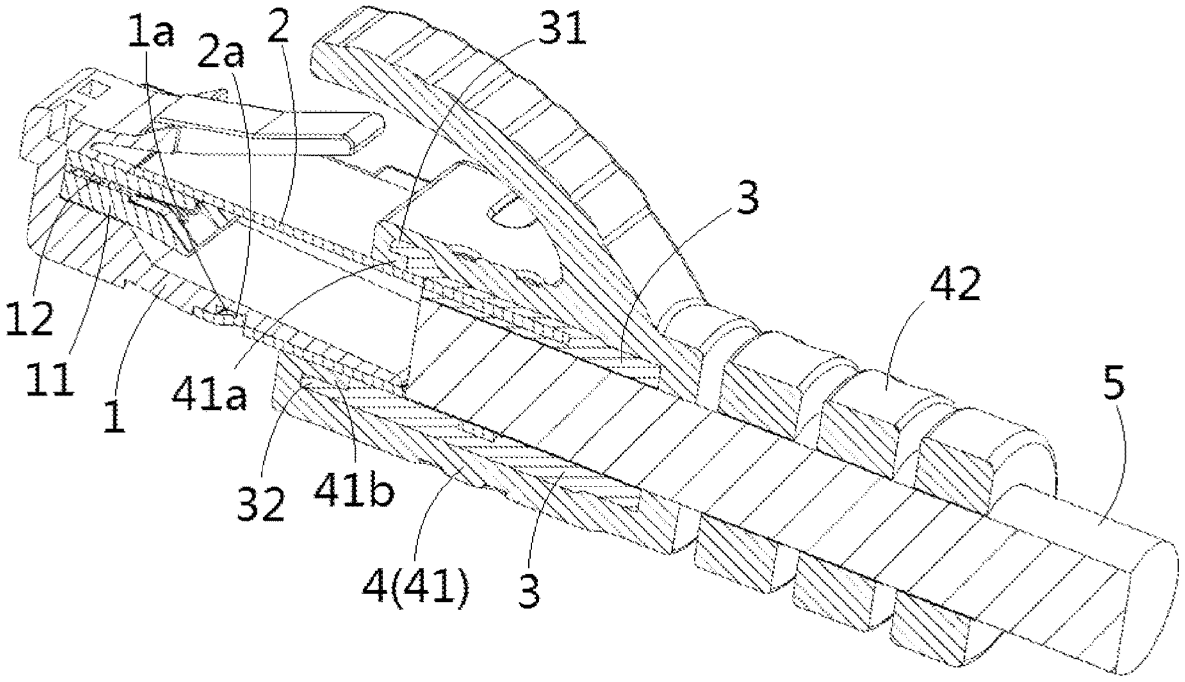
FIG. 2 is a longitudinal cross-sectional view of a connector according to an exemplary embodiment of the present invention.
Figure 3:
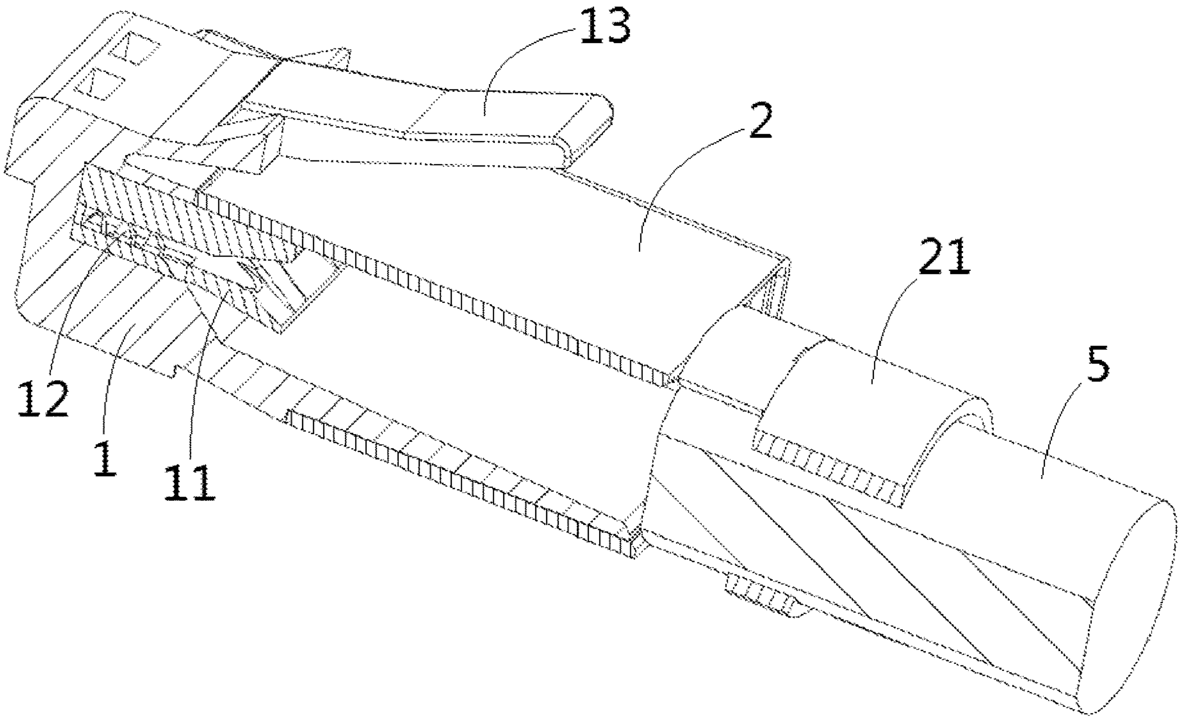
FIG. 3 is a longitudinal cross-sectional view of a connector according to an exemplary embodiment of the present invention, wherein the inner and outer sheaths are not shown.
Figure 4:
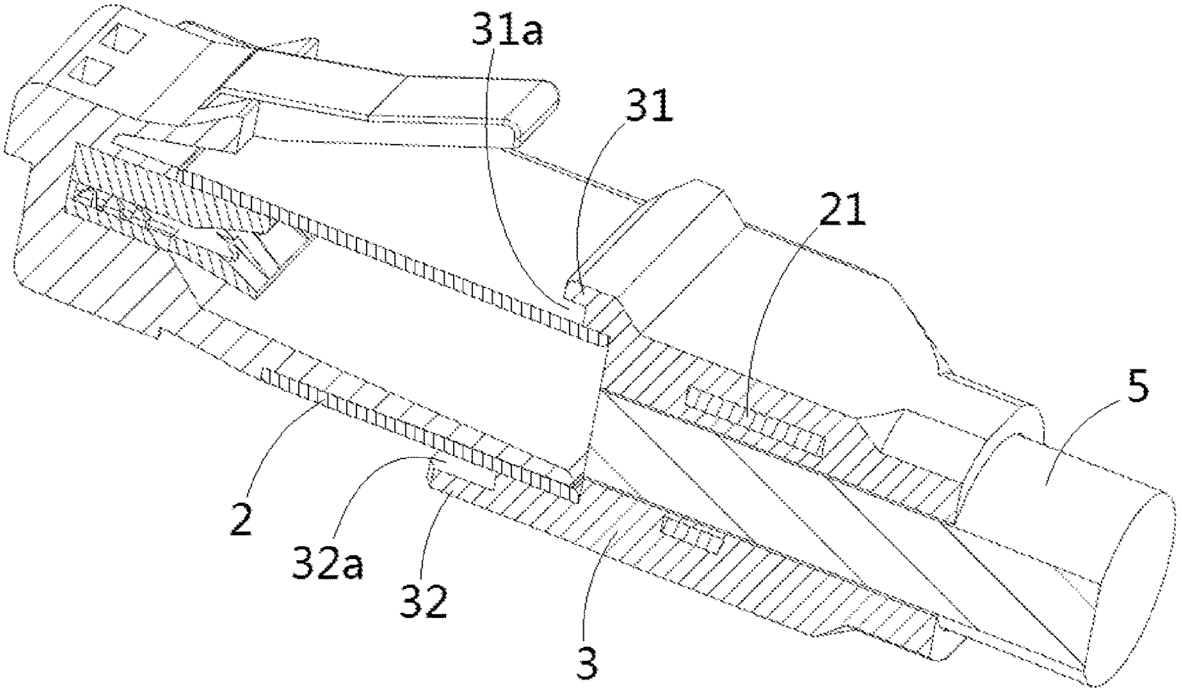
FIG. 4 is a longitudinal cross-sectional view of a connector according to an exemplary embodiment of the present invention, where the outer sheath is not shown.

FIG. 1 is an illustrative perspective view of a connector according to an exemplary embodiment of the present invention. FIG. 2 is a longitudinal cross-sectional view of a connector according to an exemplary embodiment of the present invention. FIG. 3 is a longitudinal cross-sectional view of a connector according to an exemplary embodiment of the present invention, wherein an inner sheath and an outer sheath are not shown. FIG. 4 is a longitudinal cross-sectional view of a connector according to an exemplary embodiment of the present invention, where the outer sheath is not shown.

As shown in FIGS. 1-4, in an exemplary embodiment of the present invention, a connector (e.g., an RJ45 connector) is disclosed which includes an insulation housing 1, a shielding shell 2, an inner sheath 3, and an outer sheath 4. The shielding shell 2 is sheathed on the insulation housing 1. The inner sheath 3 is molded onto the shielding shell 2 by injection molding. The outer sheath 4 is molded onto the shielding shell 2 and the inner sheath 3 by injection molding. The inner sheath 3 has a front end wrapped on the shielding shell 2, and a retaining portion 31 and 32 is formed on the front end of the inner sheath. The retaining portion 31, 32 and the shielding shell 2 are spaced apart in a direction perpendicular to a longitudinal direction of the connector to form a gap 31*a*, 32*a* therebetween. The outer sheath 4 has engaging portions 41*a* and 41*b* embedded in the gap 31*a* and 32*a* between the retaining portion 31, 32 and the shielding shell 2. The retaining portions 31, 32 hold the engaging portions 41*a*, 41*b* on the shielding shell 2 to prevent a gap between the front end of the outer sheath 4 and the shielding shell. The retaining portions 31, 32 extend forward along the longitudinal direction of the connector beyond the front end surface of the inner sheath 3. The engaging portions 41*a*, 41*b* of the outer sheath 4 is engaged to the front end surface of the inner sheath and is clamped between the retaining portions 31, 32 and the shielding shell 2.

The shielding shell 2 includes top and bottom walls opposite each other in a height direction of the connector. The retaining portions 31, 32 include a first retaining portion 31 and a second retaining portion 32. The first retaining portion 31 is located above the top wall of the shielding shell 2 and spaced apart from the top wall of the shielding shell. The second retaining portion 32 is located below the bottom wall of the shielding shell 2 and is spaced apart from the bottom wall of the shielding shell.

In the exemplary embodiment, the engaging portions 41*a*, 41*b* include a first engaging portion 41*a* and a second engaging portion 41*b*. The first engaging portion 41*a* is embedded in the first gap 31*a* between the first retaining portion 31 and the top wall of the shielding shell 2. The second engaging portion 41*b* is embedded in the second gap 32*a* between the second retaining portion 32 and the bottom wall of the shielding shell 2. The first retaining portion 31 protrudes from the top surface of the inner sheath 3 and extends forward from the front end surface of the inner sheath. The second retaining portion 32 is flush with the bottom surface of the inner sheath 3 and extends forward from the front end surface of the inner sheath.

The shielding shell 2 includes a left side wall and a right side wall opposite each other in the transverse direction of the connector. Although not shown, the retaining portions 31, 32 may also include a third retaining portion and a fourth retaining portion. The third retaining portion is located on the left side of the shielding shell 2 and is spaced apart from the left side wall of the shielding shell. The fourth retaining portion is located on the right side of the shielding shell 2 and is spaced apart from the right side wall of the shielding shell. Although not shown, the engaging portions 41*a*, 41*b* may also include a third engaging portion and a fourth engaging portion. The third engaging portion is embedded in a third gap between the third retaining portion and the left side wall of the shielding shell 2. The fourth engaging portion is embedded in a fourth gap between the fourth retaining portion and the right side wall of the shielding shell 2.

The outer sheath 4 includes a body portion 41 and an elastic buffer portion 42. The body portion 41 is wrapped on the inner sheath 3 and the shielding shell 2. The elastic buffer portion 42 is connected to the rear end of the body portion 41. The engaging portions 41*a*, 41*b* are formed on the front end of the body portion 41, and the elastic buffer portion 42 extends backward for a predetermined length from the rear end of the body portion to provide stress relief for the cable 5 that passes through it.

An elastic latch 13 is provided on the insulation housing 1. The elastic latch 13 is used to lock a mating connector. The outer sheath 4 also includes an unlocking portion 43 formed on the body portion 41. The elastic latch 13 can be moved from the locking position engaged with the mating connector to the unlocking position separated from the mating connector under the pressure of the unlocking portion 43. In the illustrated embodiment, the elastic latch 13 is integrally formed with the insulation housing 1. However, the present invention is not limited to this embodiment, for example. The elastic latch 13 may be a separate component fixedly mounted to the insulation housing 1.

The connector further includes a plurality of connection terminals 12 and a cable 5. The plurality of connection terminals 12 are fixedly arranged in the insulation housing 1. The cable 5 passes through the outer sheath 4 and the inner sheath 3. A plurality of core wires of the cable 5 are respectively electrically connected to the plurality of connection terminals 12.

The connector further includes a terminal holder 11. The terminal holder 11 is formed with a plurality of slots and fixedly installed in the insulation housing 1. The plurality of connection terminals 12 are respectively inserted into the plurality of slots of the terminal holder 11.

An elastic snap 2*a* is formed on the shielding shell 2. A snap slot 1*a* is formed on the insulation housing 1. The elastic snap 2*a* is locked into the snap slot 1*a* to secure the shielding shell 2 to the insulation housing 1.

A portion 21 of the shielding shell 2 extends rearward beyond the rear end of the insulation housing 1 and is embedded in the inner sheath 3. This arrangement enables the inner sheath 3 and the shielding shell 2 to reliably bond together.

In the illustrated embodiment, the aforementioned connector may be an RJ45 connector.

In another exemplary embodiment of the present invention, a connector assembly is also disclosed. The connector assembly includes the aforementioned connector and a mating connector. The mating connector is mated with the connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:
- an insulation housing;
- a shielding shell sheathed on the insulation housing;
- an inner sheath formed on the shielding shell by injection molding, including:
  - a front end wrapped on the shielding shell; and
  - a retaining portion formed on the front end of the inner sheath and spaced from the shielding shell to form a gap therebetween; and
- an outer sheath formed on the shielding shell and the inner sheath by injection molding and including an engaging portion embedded in the gap between the retaining portion and the shielding shell, the retaining portion holding the engaging portion on the shielding shell to prevent the formation of a gap between the front end of the outer sheath and the shielding shell.

2. The connector according to claim 1, wherein the retaining portion extends forward along the longitudinal direction of the connector beyond a front end surface of the inner sheath, and the engaging portion of the outer sheath engages with the front end surface of the inner sheath and is clamped between the retaining portion and the shielding shell.

3. The connector according to claim 1, wherein:
- the shielding shell comprises a top wall and a bottom wall opposite each other in the height direction of the connector; and
- the retaining portion comprises:
  - a first retaining portion located above and spaced apart from the top wall of the shielding shell; and
  - a second retaining portion located below and spaced apart from the bottom wall of the shielding shell.

4. The connector according to claim 3, wherein the engaging portion comprises a first engaging portion embedded into a first gap between the first retaining portion and the top wall of the shielding shell, and a second engaging portion embedded into a second gap between the second retaining portion and the bottom wall of the shielding shell.

5. The connector according to claim 3, wherein the first retaining portion protrudes upward from the top surface of the inner sheath and extends forward from the front end surface of the inner sheath.

6. The connector according to claim 5, wherein the second retaining portion is flush with the bottom surface of the inner sheath and extends forward from the front end surface of the inner sheath.

7. The connector according to claim 1, wherein the outer sheath comprises a body portion wrapped on the inner sheath and the shielding shell, and an elastic buffer portion connected to the rear end of the body portion.

8. The connector according to claim 7, wherein the engaging portion is formed on the front end of the body portion, and the elastic buffer portion extends backward for a predetermined length from the rear end of the body portion to provide stress relief for a cable passing through the elastic buffer portion.

9. The connector according to claim 8, wherein an elastic latch is arranged on the insulation housing and is adapted to lock to a mating connector.

10. The connector according to claim 9, wherein the outer sheath further comprises an unlocking portion formed on the body portion, the elastic latch is adapted to be moved from a locking position engaged with the mating connector to an unlocking position separated from the mating connector under the pressure of the unlocking portion.

11. The connector according to claim 10, wherein the elastic latch is integrally formed with the insulation housing.

12. The connector according to claim 1, further comprising:
- a plurality of connection terminals fixedly arranged in the insulation housing; and
- a cable passing through the outer sheath and the inner sheath.

13. The connector according to claim 12, further comprising a terminal holder formed with a plurality of slots and fixedly installed in the insulation housing, the plurality of connection terminals are received within the plurality of slots of the terminal holder.

14. The connector according to claim 1, wherein an elastic snap is formed on the shielding shell, and a snap slot is formed on the insulation housing, the elastic snap is locked into the snap slot to fix the shielding shell to the insulation housing.

15. The connector according to claim 1, wherein a portion of the shielding shell extends rearward beyond a rear end of the insulation housing and is embedded into the inner sheath such that that the inner sheath and the shielding shell are bonded together.

16. The connector according to claim 1, wherein the connector is an RJ45 connector.

17. A connector, comprising:
- a shielding shell adapted to be arranged over an insulation housing;
- an inner sheath formed on the shielding shell, including:
  - a front end wrapped on the shielding shell; and
  - a retaining portion formed on the front end of the inner sheath and spaced from the shielding shell to define a gap therebetween; and
- an outer sheath including an engaging portion embedded in the gap between the retaining portion and the shielding shell, the retaining portion fixing the engaging portion against the shielding shell.

18. The connector according to claim 17, wherein the outer sheath is molded onto the shielding shell and the inner sheath.

* * * * *